(12) United States Patent
Lohrmann et al.

(10) Patent No.: US 7,352,651 B2
(45) Date of Patent: Apr. 1, 2008

(54) SYSTEM AND METHOD FOR DETERMINING DIRECTIONAL AND NON-DIRECTIONAL FLUID WAVE AND CURRENT MEASUREMENTS

(75) Inventors: Atle Lohrmann, Oslo (NO); Torstein Kanstad Pedersen, Oslo (NO)

(73) Assignee: Nortek AS, Rud (NO)

( * ) Notice: Subject to any disclaimer, the term of this patent is extended or adjusted under 35 U.S.C. 154(b) by 190 days.

(21) Appl. No.: 11/293,918

(22) Filed: Dec. 5, 2005

(65) Prior Publication Data
US 2007/0019505 A1     Jan. 25, 2007

Related U.S. Application Data

(60) Provisional application No. 60/694,837, filed on Jun. 29, 2005.

(51) Int. Cl.
*G01S 15/58* (2006.01)
(52) U.S. Cl. .................................................. 367/90
(58) Field of Classification Search ............. 367/89, 367/90; 73/861.13
See application file for complete search history.

(56) References Cited

U.S. PATENT DOCUMENTS

| 6,052,334 | A | * | 4/2000 | Brumley et al. | 367/90 |
| 6,282,151 | B1 | * | 8/2001 | Brumley et al. | 367/90 |
| 6,345,683 | B1 | | 2/2002 | Gordon et al. | |
| 6,453,256 | B1 | | 9/2002 | Gordon et al. | |
| 6,700,834 | B2 | * | 3/2004 | Brumley et al. | 367/90 |
| 2002/0018400 | A1 | * | 2/2002 | Brumley et al. | 367/90 |
| 2007/0019505 | A1 | * | 1/2007 | Lohrmann et al. | 367/25 |

* cited by examiner

*Primary Examiner*—Dan Pihulic
(74) *Attorney, Agent, or Firm*—Stephen C. Beuerle; Procopio Cory Hargreaves & Savitch LLP

(57) ABSTRACT

A system for determining the directional properties of surface waves or internal waves of a fluid medium includes a sonar system having a plurality of transducers for generating respective, separate acoustic beams and receiving echoes from one or more range cells located substantially within the beams; and a computer program executed by a processor for determining the directional properties associated with the surface waves or internal waves from the received echoes, wherein the computer program determines along-beam velocities along the separate acoustic beams and combines the along-beam velocities to form an equivalent orbital velocity vector.

28 Claims, 8 Drawing Sheets

SYSTEM AND METHOD FOR DETERMINING DIRECTIONAL AND NON-DIRECTIONAL FLUID WAVE AND CURRENT MEASUREMENTS

CROSS-REFERENCE TO RELATED APPLICATIONS

This application claims the benefit of U.S. Provisional Application 60/694,837 filed Jun. 29, 2005 under 35 U.S.C. 119(e).

FIELD OF THE INVENTION

The present invention relates to directional and non-directional water wave measurements and current measurements.

BACKGROUND OF THE INVENTION

Scientists are interested in physical characteristics of bodies of water. Among these characteristics are waves and fluid flow, most commonly referred to as currents. Both of these physical characteristics serve as forcing mechanisms, which can largely influence activities in bodies of water. These activities include many biological processes, navigation, industrial applications, structural response evaluation, and weather to name a few.

The nature of currents and waves is often random in behavior and therefore a complete understanding requires an accurate means of measurement. One of the most common ways to quantify and describe this behavior is to perform location specific measurements.

Over the years, there have been several ways of measuring waves and currents. The variety of measurement approaches is partially due to the evolution of technology and partially due to the requirements to withstand different environmental conditions. The challenge of measuring currents and waves is that the environment itself is not particularly favorable for in situ measurements.

Doppler Current Measurements

Current measurements are increasingly performed using acoustic Doppler technology. Acoustic Doppler measurements of currents involve transmitting a pulse of acoustic energy of known frequency into a fluid of known sound speed and detecting the acoustic return, which reflects from acoustic-scattering particles in the fluid medium. The change in frequency of the detected pulse, or Doppler shift, is an indication of the fluid's speed in the direction of the propagating acoustic wave, or acoustic beam. Measuring the fluid velocity from three unique and known geometric directions presents a method of estimating the three-dimensional velocity. An estimate of the fluids velocity relative to the acoustic instrument can be determined by performing a standard coordinate transformation from the acoustic beam coordinates to any other standard coordinate system, such as xyz and east-north-up. In order to transform between coordinate systems, there is an assumption that the flow is uniform within the volume of fluid bounded by the acoustic beams.

Remotely measuring fluid motion from the instrument itself is a distinct advantage of acoustic Doppler velocity measurements. This fact allows for measuring flow characteristics at several distances from the instrument, and thus allows for a profile of the current velocity in a direction away from the Doppler instrument.

Wave Measurements

The measurement of surface waves applies to any large body of water. For simplicity, the following discussion will refer to this large body of water as an ocean, lake, or harbor; and the surface waves may be referred to as waves or ocean waves. Some special cases may include man made bodies of water such as laboratory water tanks.

Over the last several decades, there have been several instruments or approaches to measuring and characterizing waves. The characterization is most commonly done according to estimates of standard wave parameters such as height, period, and direction. Specific examples of these include significant height, maximum height, peak period, mean period, peak direction, mean direction, and directional spread. The estimates are a result of processing a time series of data. The time series are measurements of some kind of quantity that is directly relatable to surface waves. This quantity may be pressure, orbital velocities, surface slope, or surface displacement to name a few. Most of these measured quantities require some kind of transfer function that relates the measured quantity to the surface displacement.

Ocean waves are a random event in nature. Characterizing random events requires establishing an ensemble of measurements according to statistical theory. Measuring random yet periodic waves means that the length of the measurement record must be long enough to adequately represent the energy at the frequencies present. This duration usually ranges from several minutes to half an hour. It is assumed that ocean waves are statistically stationary during this measurement period.

The measurement ensembles are typically repeated at a regular cycle. This cycle is frequent enough to adequately track changes in the wave climate, and often ranges from half an hour to 3 hours. The total duration of a typical data collection exercise must be long enough to infer the wave climate for the location; the test would therefore contain several calm and storm events. A more thorough measurement exercise would be either long enough to include seasonal variations or permanently installed.

The most challenging aspect of the measurement requirements is that the instrument must be on site measuring waves on a regular schedule for extended periods of time. Exposure to a harsh ocean environment is therefore unavoidable and represents one of the clear challenges of measuring waves.

Storm events are quite harsh on ocean instrumentation. This is especially true for instrumentation exposed to wave forces. Given the requirements for wave measurements, the basic goals for the instrumentation is to have an accurate yet cost effective manner that is robust enough to handle its environment. Furthermore, the measurement device should not influence the wave characteristics. After considering these criteria, it is clear that all instruments have their strengths, weaknesses and optimum regime of operation.

Wave measurements can be divided into two broad descriptors. These are directional and non-directional. Directional estimates characterize not only where waves are coming from, but also the directional distribution of the wave energy; recall that waves are random and have contributions from many directions. Non-directional wave estimates characterize the energy distribution and commonly provide estimates of height and period.

Some of the more common approaches for determining non-directional wave estimates such as height and period include measurements of pressure, wave orbital velocity, surface elevation, surface velocity, or surface acceleration.

Instrumentation with a sensor measuring these is often single point measurements, but may also be part of a system of sensors.

Determining wave direction characteristics is more complex and requires a system of measurements. A system may be composed of several measurements at one location; this type of system is usually three measurements that measure a vertical and two orthogonal/horizontal wave characteristics. This is called a "triple-point" measurement. Two of the more common triple-point systems are wave buoys and PUV instruments (pressure and two orthogonal, horizontal velocity measurements at one common point).

The other class of directional measurement system is array types of sensors. Sensor arrays may be any collection of measurements that have a horizontal separation that permits some form of array processing of the spatial lags associated with measurements of the waves passing through the array. Two of the more common arrays are pressure sensor arrays and current Doppler arrays.

Many of the measurements for waves require a special transfer function which allows the measurements to be transformed into a meaningful estimate of the variations of the ocean surface. The transfer function typically follows what is known as linear wave theory. Wave quantities that are measured below the surface (wave orbital velocity and pressure) require special attention since the signal attenuates dramatically from the surface towards the ocean floor. The degree to which the attenuation occurs depends on the wavelength of the waves we are measuring. As a rule, long waves have less attenuation than short waves. The exact manner in how this behaves is well described in linear wave theory but remains complex enough to trouble most newcomers to wave measurements.

An important detail to bear in mind about instruments that measure wave quantities at depth, is that the attenuation will ultimately influence the instrument's operational frequency band. The degree to which this occurs depends largely on the depth of the measurement.

Surface Instruments a) Wave Staffs

Wave staffs are perhaps the most intuitive instruments to understand since they operate at the fluid-atmosphere interface and measure exactly what the user is interested, surface displacement. Often these wave gauges are a wire that runs vertically on a staff and outputs a voltage that is proportional to the length of submerged wire. Sampling the length of submerged wire for an interval of time provides a time history of the wave displacement. The measurement represents a change in surface elevation just at that point.

Wave staffs are an accurate instrument, but are not practical in most measurement scenarios. An example of the impracticality is in coastal waters where the depths are greater than a few meters. Here it is not realistic to have a rigid structure that can both handle the tough environment as well as small enough to not influence the waves themselves.

Some existing coastal structures may have staffs mounted to them. The structure influences the waves and this compromises the accuracy of the measurement. In light of these constraints, wave staffs are often found only in laboratories and wave tanks.

b) Wave Buoys

Wave buoys are similarly intuitive for the most part. These instruments measure motion directly on the surface. How they do this is a little more complicated and varied. Wave buoys are called "wave following" instruments, and as the name implies they "follow" the motion of a passing wave. There are several methods for measuring this motion; most measure acceleration (accelerometers) and rotation (tilt sensors). The more recent buoys include a GPS (Global Positioning System) receiver, which measures change of position.

Buoys offered the first practical and accurate in situ measurement of waves in the ocean, and for this reason buoys have become a standard. This is primarily attributed to the fact that for many years there was no other practical solution that could withstand the harsh ocean environment. However, wave buoys are not immune to the environmental conditions and the fact that buoys are deployed on the ocean's surface has taken its toll on buoys over the years; where storms, fishermen, and shipping traffic account for most of lost buoys. Still to date, buoys remain the only practical solution for measuring waves in depths greater than 100 meters.

The performance characteristics of buoys are quite good, and wave buoys have demonstrated the ability to accurately estimate standard wave parameters. Wave buoy measurement limitations are associated with long waves (period>20 seconds) and short waves (period<1.5 seconds). All buoys have a frequency for which they will resonate. This resonant frequency marks the upper frequency limit they are incapable of measuring waves. The resonant frequency is most influenced by the shape and size of the buoy. Therefore, most wave buoys are designed to have a resonant frequency, which lies in a frequency band outside the band of interest to most scientists. The more common wave buoys have a resonant frequency of 1 Hz. The effective upper frequency limit after filtering is approximately 0.7 Hz.

Sometimes motion sensors are placed on multi-function buoys to measure waves. The added physical demands (space and weight) of these other functions often lower the resonant frequency response of the buoy, and therefore complicate the buoy's ability to respond to wave motion. The result is a poorer description of wave characteristics. Some of these buoys include meteorological buoys that have towers on them or navigational buoys, which are designed to be stationary and not respond to waves.

Bottom Mounted Instruments

The other broad class of instruments is bottom mounted and these include a wide range of PUV type instruments and a handful of Doppler type instruments. The fact that they are bottom mounted provides one significant advantage and that is they are out of harms way.

c) PUV Type of Instruments

One of the most common types of bottom mounted instruments is the PUV type. The name "PUV" is simply the abbreviation of the quantities measured to estimate wave parameters. These are pressure (P) and the horizontal velocity components (U and V) associated with a wave's orbital motion. The method is a typical "triple-point" type of measurement. Triple-point measurements include a scalar quantity that can be used to infer surface displacement, and two orthogonal vector quantities to estimate wave direction. The three quantities are measured close together, relative to the length of the wave. The PUV class of instruments can naturally be any instrument that measures both pressure and the horizontal components of orbital velocity. For this reason, one can find a relatively wide range of vendors who offer this solution.

Non-directional estimates such as wave height and period are inferred from the energy distribution from either the pressure or velocity spectra. The directional estimates are calculated from the relationship between the velocity and pressure measurements.

Although the PUV method has many advantages, there exists a significant depth limitation for its performance. The depth limitation defines an upper frequency limitation for which the PUV can not estimate wave properties. The deeper the PUV instrument is positioned in the water, the lower this frequency limit becomes. The difficulty most engineers and scientist have with understanding this depth limitation is that there is not a unique depth at which the performance will cut off. The frequency limit is determined by the relationship between the wavelength and instrument's depth.

The limitation arises from the fact that both the quantities being measured (pressure and velocity) attenuate exponentially with depth and the rate at which the attenuation occurs depends on the wavelength.

Another way of looking at this problem is that the signal associated with long waves penetrates further down in the water column than the signal for shorter wavelength waves. This means longer waves (or lower frequency waves) can be measured in deeper waters than shorter waves (high frequency waves).

d) Pressure Sensor Arrays

Pressure sensor arrays are yet another method for measuring and estimating wave characteristics. Again, the pressure measurements are constrained by the same depth and wave frequency limitations as that of the PUV. The difference between the two is the method of estimating wave direction. Pressure sensors arrays are located below the surface and are separated horizontally at some distance from one another. The separation distance is generally half a wavelength of the shortest wave to resolve. This approach attempts to use the spatial lags between pressure measurements to resolve wave direction. This is an inverse problem and therefore necessitates special treatment. The solution most commonly used is a form of the Maximum Likelihood Method (MLM). The MLM solution determines the most probable direction that minimizes the error from the cross spectra of the measurements. The MLM solution is not limited to pressure sensors but can be any array of spatially separated wave measurements. These measurements include, but are not limited to surface slope, surface position, accelerations, and orbital velocities In addition to the limitation imposed by the attenuation of the wave properties, there is another frequency limitation that is associated with the spatial size of the array itself. Wave directions can only be resolved for waves that have a wavelength that is longer than twice the horizontal distance of the closest array measurements.

e) Doppler Current Profilers

Current profilers that employ the acoustic Doppler effect are yet another type of bottom mounted wave measurement instrument. These instruments were initially used to profile currents but can also measure the local orbital currents created by waves. One clear advantage is that the depth limitation of the PUV subsurface instruments is partially circumvented by measuring the orbital wave velocities near the ocean surface, where wave motion is less attenuated. This means the instrument can measure more of the short wave spectrum than a PUV instrument deployed at the same depth. A complication is that this approach no longer measures the orbital velocities at one location but in three or more spatially separated locations.

The measurement locations or cells construct an array projected up near the surface. Therefore, the typical procedure for estimating wave direction (and other wave properties) is similar to the solution for the pressure sensor array; both may use the Maximum Likelihood Method. The array of Doppler measurements is mathematically more complicated since each of these cells has a unique orientation relative to the incident waves and therefore a unique response. The response of the measurements is necessary for the complete solution.

The complexity of the solution lies in the fact that the direction of the waves is not known beforehand and the response of the measurements are directionally dependent. This means the solution requires solving the direction first. The stated problem again is an inverse problem, which is why the MLM is used. The results prove to be quite good under most situations. The solution is particularly good for resolving waves from two unique directions having the same frequency.

It is important to note that this is a two step procedure for processing data from Doppler type of instruments that use the MLM. First the directional distribution of wave energy must be calculated, after which the non-directional energy distribution can be determined. This is because the non-directional spectra and parameters are inferred from the orbital velocity measurements and the transformation to surface displacement requires the directional dependent transfer function to be determined first.

The MLM solution requires that the measurements do not have high coherence. High coherence in wave measurements occurs when the spatial lags between measurements are small or when the horizontal spatial separation is small relative to the wavelength. This can be further complicated if the measurement array is overpopulated with several measurement locations, some of which having high coherence with one another. The inversion process becomes increasingly unstable when the described situation occurs. An example of such an array would be an array that has numerous array elements where the separation is small relative to the wavelength of the wave being measured.

Another example where the MLM solution is not appropriate would be if the instrument is on a moving platform. In such a situation the position of the measurement cells would be constantly moving over the course of the measurement period. The number of degrees of freedom resulting from measurements at several different locations (due to platform motion) would increase to a point where the MLM approach would be either unstable or computationally prohibitive. In summary, the MLM solution is an accurate solution; however, it is complex and the various limits of its use must be well understood prior to implementation.

f) Acoustic Surface Tracking (AST)

Doppler instruments which measure near surface orbital velocities from the bottom do extend the upper frequency range for bottom mounted wave instruments. Unfortunately, there remains a depth dependent upper frequency limit for these instruments as well. The limit is imposed by the spatial relationship between the wavelength and the spacing between measurements. As a rule, the upper frequency limit for Doppler profiler arrays exists when the frequency associated with waves having a wavelength that is shorter than two times the spacing of the two nearest array elements. This upper frequency limit becomes more restrictive as the instrument is positioned at greater depths and the measurement positions become more separated in space. Deployments in greater depths lead to larger separation distances. As a result this limits Doppler profilers to the measurement of only long waves (low frequency) or deployments in coastal depths.

The constraints imposed by the relationship between array size and wavelength not only effects the upper frequency limit of the directional wave solution but also the upper frequency limit of the non-directional solution. This means the solution neglects the shortest waves from the total estimate. The resulting effect of this is usually an underestimation of the true wave height.

One way to get around the limits for non-directional wave estimates is to directly measure the position of the ocean surface. This can be done using acoustic ranging from the instrument to the surface. This is also known as echo ranging which is common to boat mounted depth sounders. The difference here is that this technique measures the continuous change of the surface position, and therefore it is referred to as acoustic surface tracking (AST). The distance can be directly estimated from knowing the speed of sound in the fluid medium and the time of travel between transmission and reception of the acoustic pulse. Acoustic surface tracking measures surface displacement at one position, and therefore it is limited to non-directional waves estimates when used as an independent estimator.

The acoustic surface tracking has two very distinct advantages over the other bottom mounted wave measurement methods. The first is that acoustic surface tracking is a direct measure of the waves and does not require a transfer function to infer surface displacement. The second advantage is that it does not have a depth dependent frequency limit as the pressure and velocity measurements have. The result is more accurate wave measurements and that the sensor itself can be deployed at greater depths.

The Search for a Depth Independent Wave Measurement Solution

The challenges of measuring waves are highlighted with each of the techniques discussed. First is the problem of exposure of instrumentation on or near the ocean surface. This can be overcome by moving the instrument to a subsurface position that allows it to remotely sense or measure the surface waves. The logical option is to move the instrument below the ocean surface. This location has diminished wave forcing and no exposure to shipping traffic.

Subsurface mounted sensors such as the combined pressure-velocity (PUV) alleviate the issue of instrument loss due to high exposure on the ocean surface. The method is still limited to low frequency waves and therefore it remains a viable option for relatively shallow deployment depths in the water column.

The Doppler profiler class of combined current profiler and wave measurement instruments improves upon the limits of the PUV method since it is capable of measuring wave induced currents up near the surface where the signal is strong. This allows the bottom-mounted instrument to operate at a greater depth than the PUV type of instruments. The problem with measuring wave orbital velocity is that the approach requires a computational intensive solution known as the Maximum Likelihood Method (MLM) to estimate the directional distribution. Additionally, the Doppler profiler still has two limits. The first is that it has an upper frequency limit. The second limit is that the wave directional processing method, the MLM, requires measurements on a stationary platform so that the velocity measurements are made at a repeatable location during the ensemble measurement cycle. Therefore, the current profiler using MLM processing can not be placed on a moving platform such as a subsurface buoy.

Therefore, a need exists for a subsurface mounted instrument that circumvents the attenuation of wave properties as the current profiler does, yet is simplistic like the PUV solution so that it may be mounted on a moving platform (e.g. subsurface buoy).

The inventors have recognized the following. A need exists to measure and estimate surface wave directional characteristics and non-directional characteristics. The estimates must be accurate for the frequency range of waves commonly known as gravity waves. The instrument must be below the surface and out of harms way. Ideally, the instrument must be able to measure wave properties from a moving platform such that there is a tractable directional solution from the raw wave data. The platform could be a subsurface buoy. The advantage of subsurface measurements is that it is not depth limited but can be used for full ocean depths. The system would permit an instrument to measure waves in all waters of the world with an appropriate mooring system and subsurface buoy, and therefore not limit stationary Doppler instruments to shallow coastal waters.

SUMMARY

In the system and methods of the present invention, directional and non-directional wave estimates are determined in a way that allows the measurement platform to rotate, yet the wave estimates are still accurate. A new measurement strategy and hybrid processing approach will be described. The invention is a combination of both AST and measurements of wave orbital motion just below the surface.

The measurement method and the processing method are both important aspects of the invention. The AST measurement follows the standard echo ranging procedure. The orbital velocity measurements require special treatment. The treatment involves measuring the velocity as close to the surface as possible and then measuring the instruments attitude and orientation (tilt and heading) for every ensemble measurement and applying a transformation. The transformation takes the along-beam velocity measurements, applies the known geometry of the acoustic beams as well as the measured instrument attitude and orientation, and outputs the velocity in an earth-referenced coordinate system. This earth-referenced velocity vector is referred to as the equivalent wave orbital velocity.

A more descriptive manner to state this is that during the measurement step, the measurements are transformed to an estimate that is representative but not identical to the wave orbital velocity at the center of the array. Because the along-beam velocities are not measured in the same point in space, they represent different instances of the wave orbital field and the equivalent wave orbital velocity is not identical to the wave orbital velocity at the center of the acoustic beam array. However, to first order, the phase the equivalent velocity used in the wave processing is the same as the phase of the true velocity at the center of the array.

The second step is the processing where the representative orbital velocity is used in combination with the AST measurements to estimate wave direction. The error term present in the equivalent wave orbital velocity (relative to the true velocity) does not effect the directional estimates because the processing is performed using a triplet analysis, which allows like error terms to cancel out to first order.

Another aspect of the invention involves a system for determining the directional properties of surface waves or internal waves of a fluid medium. The system includes a sonar system having a plurality of transducers for generating respective, separate acoustic beams and receiving echoes from one or more range cells located substantially within the beams; and a computer program executed by a processor for determining the directional properties associated with the surface waves or internal waves from the received echoes, wherein the computer program determines along-beam velocities along the separate acoustic beams and combines the along-beam velocities to form an equivalent orbital velocity vector.

A further aspect of the invention involves a method for determining the directional properties of surface waves or internal waves of a fluid medium with a sonar system. The method includes generating respective, separate acoustic beams; receiving echoes from one or more range cells located substantially within the beams; measuring along-beam velocities along the separate acoustic beams; and combining the measured along-beam velocities to form an equivalent orbital velocity vector for the surface waves or internal waves of the fluid medium.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

With reference to FIGS. 1-9, a system 100 and method for determining directional and non-directional fluid wave and current measurements will be described.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1:
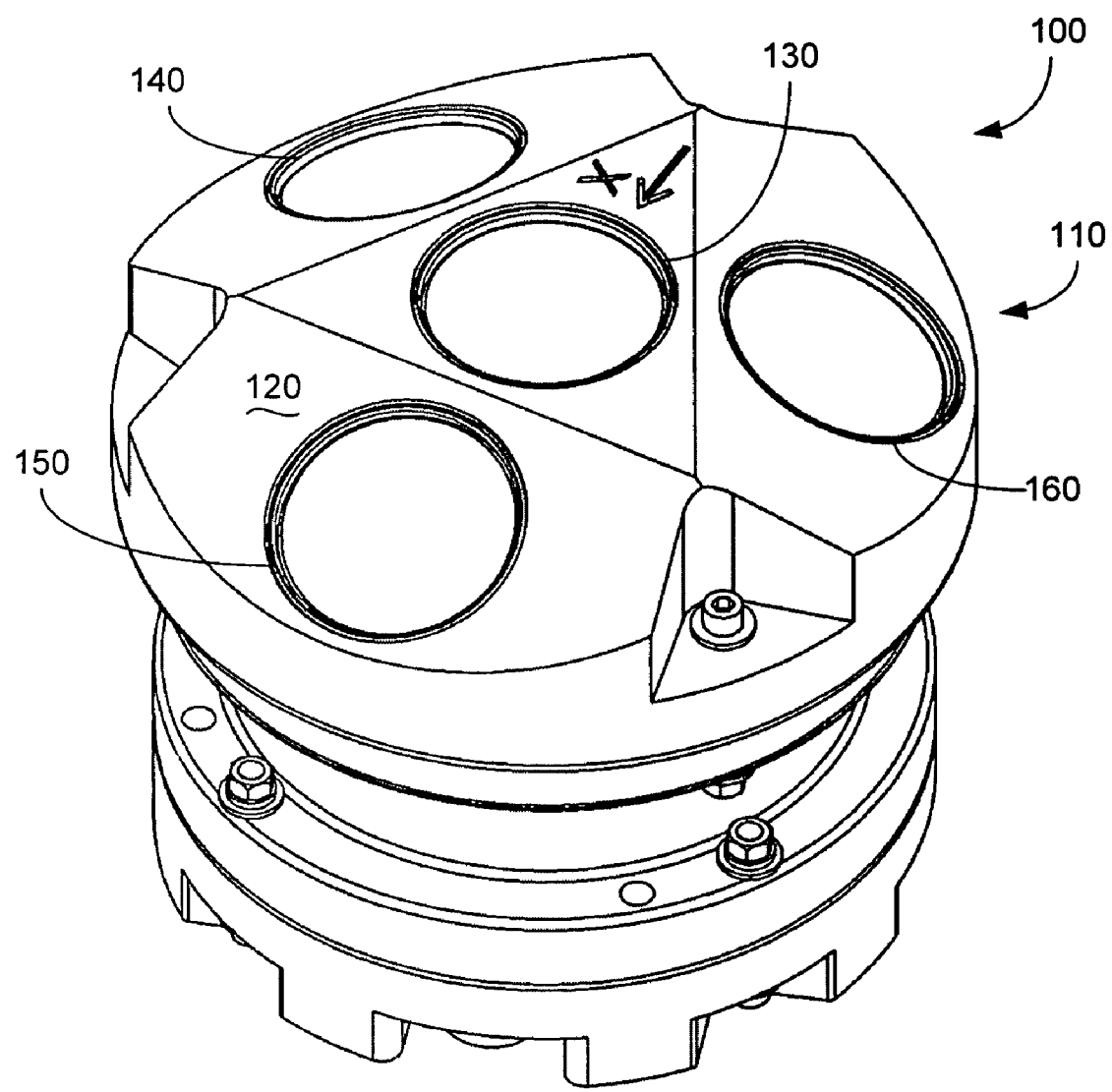
FIG. 1 is perspective view of an embodiment of a system for determining directional and non-directional fluid wave and current measurements.

With reference initially to FIG. 1, the system 100 comprises an acoustic wave and current sensor ("AWAC"). In alternative embodiments, the system 100 may include one or more alternative instruments. In the embodiment shown, the AWAC 100 includes a relatively small cylindrical housing 110 (e.g., 19 cm diameter, 19 cm height). The cylindrical housing 110 houses electronics and is made of Delrin plastic. A head 120 of the AWAC 100 has four transducers 130, 140, 150, 160. A center transducer 130 points vertically up, and the three transducers 140, 150, 160 symmetrically surround the center transducer 130 and are angled off the vertical by 25 degrees. The AWAC 100 is available with a 1 MHz or 600 kHz acoustic transmit frequency.

Although not shown, on the side of the AWAC 100 there is a channel leading to a pressure sensor. The AWAC head 120 includes a metal screw that is in physical contact with an internal temperature sensor. In addition to these sensors, there is an internal compass and a tilt sensor. There are two external contacts. One is exclusively for power supply and the other for communications and power.

In the embodiment of the AWAC 100 shown, the internal electronics includes an analog to digital converter, a main processor, and memory. This handles the transmission and reception of the acoustic signal, processing of the raw signal, communications, and storage of data. As will be described in more detail below with respect to FIG. 9 the AWAC 100 may include an on-board computer system. The computer processes raw wave measurements into meaningful wave parameters. It also provides formatted, user defined output, as well as control features for the AWAC and communications.

SUV Processing

The AWAC 100 performs a measurement and processing scheme referred to as the SUV method. This approach circumvents the challenges associated with attenuation of measured wave properties as well as the wave processing limitations associated with mounting the instrument on a moving platform. Additionally, the SUV method performs direction spectra calculations in a computational efficient manner.

With reference additionally to FIGS. 2-6, the SUV approach has similarities to the PUV approach described above. Differences with the SUV approach include that the AST measurement replaces the pressure (P) measurement in the solution, and a representative measurement of the U and V orbital velocity components replace the ideal U and V measurements. The method is referred to as the SUV method or approach because the S (surface) replaces P. The following description uses U and V as horizontal velocity in the x and y directions, respectively.

Figure 2:
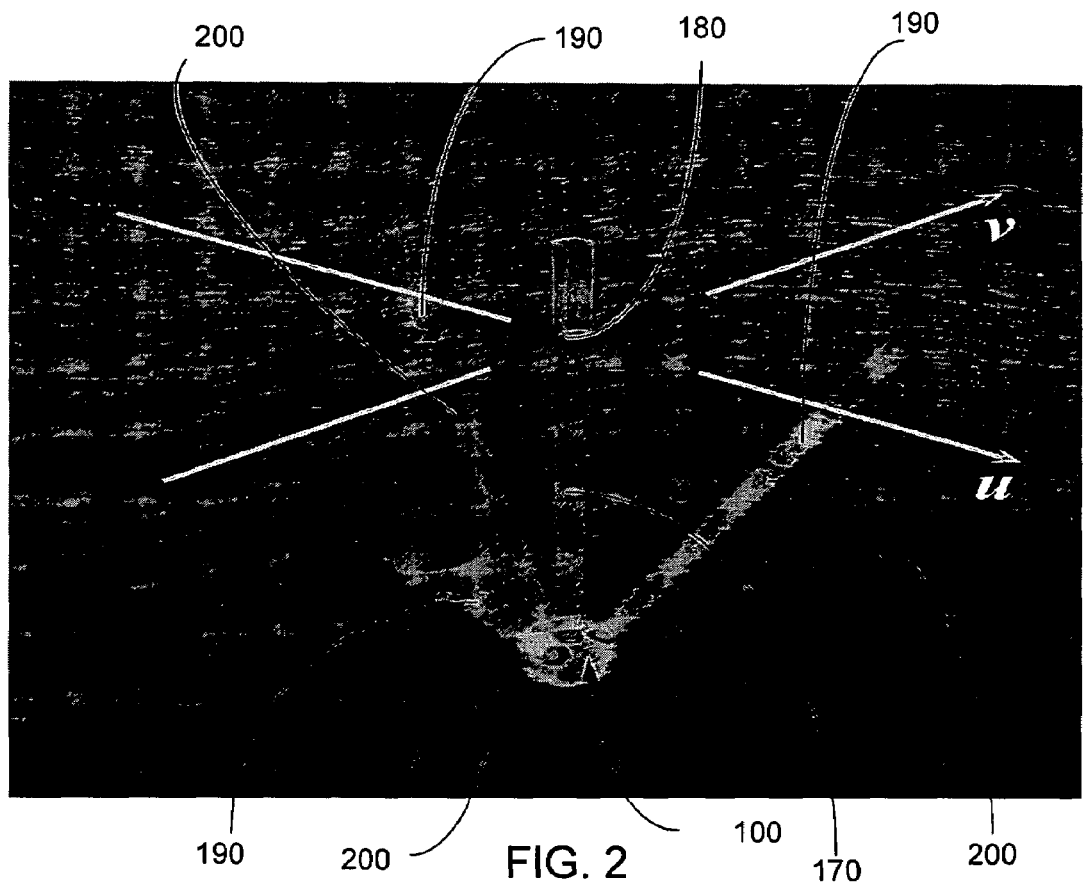
FIG. 2 is a perspective view of the system illustrated in FIG. 1 below the surface in a water environment, and shows three current measurement cells and one AST measurement. Beam measurements are transformed to U and V for the SUV method of the present invention.
Figure 3:
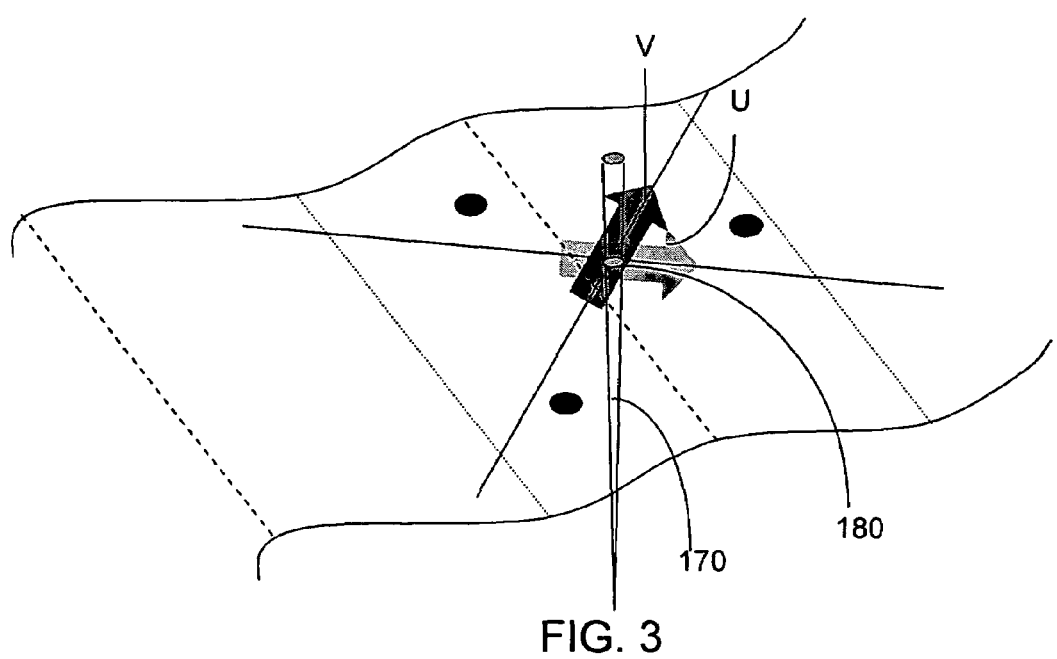
FIG. 3 is a graphical representation of the surface, the three current measurement cells, the AST measurement beam, and U and V obtained from the system in FIG. 2.

The Acoustic Surface Tracking (AST) performed by the AWAC 100 may be thought of as an inverted echo-sounder, where the AWAC 100 echo sounds to find the distance to the free surface from its position in the water column at some depth. An AST beam 170 is shown in FIGS. 2 and 3. The advantage of using AST is that it is a direct measure of free surface 180 (FIG. 3) and not subject to attenuation of the quantity measured. This means that wave parameters are not inferred from wave properties attenuated at some depth. The result is that the AWAC 100 is less sensitive to deployment depth compared to other subsurface instruments. This allows the AWAC 100 to be deployed in greater water depth environments, not just shallow water environments.

The notable differences between the PUV approach and the SUV approach are (1) that the AST measurement has vastly less attenuation than the pressure measurement of the PUV approach, and (2) the horizontal velocity components of wave orbital velocity (U and V) are measured closer to the surface with the SUV approach, where the signal is less attenuated than U and V measurements near the instrument as is done with the PUV approach. The UV measurements for the SUV approach differ from the UV measurements of the PUV approach in that the measurements are taken at spatially separated positions 190 (FIG. 3) closer to the surface. This means that the UV measurements for the SUV approach are not the "single point" measurements commonly associated with the PUV approach. Instead, the measurements for the SUV approach are taken at spatially separated locations 190 and require special treatment so that they can be used as a "triple-point" measurement. In particular, the velocities are measured along the beam and require conversion to a Cartesian coordinates.

Both the SUV approach and PUV approach include a straight forward geometric conversion step or procedure for converting from a beam coordinate system to a Cartesian coordinate system. With the SUV approach, the conversion step from a beam coordinate system to a Cartesian coordinate system includes taking the measurements at selected cells 190, which are spatially separated, and converting them to a Cartesian system. The converted velocities, U and V, represent the velocity at the center of the array of cells. The conversion is straight forward because the direction of each beam 200 relative to the AWAC 100 and the orientation of the AWAC 100 relative to the intended coordinate system to be transformed are known. In this embodiment, the Cartesian coordinate system is referenced to the Earth and may be referred to as X-Y-Z or East-North-Up. The conversion method obtains the attitude (heading and tilt) of the AWAC 100 for each beam velocity measurement. If the AWAC is mounted on a moving platform (e.g., subsurface buoy), then the rate of attitude measurements are frequent enough that the attitude during the velocity measurements is well represented. Thus, an AWAC platform with rapidly changing attitude includes an equally rapid attitude measurement that allows for the beam direction and measurement cell position to be accurately determined. The knowledge of beam geometry and instrument's attitude ultimately allows for the representative estimates of U and V to be calculated from the geometric conversion.

Figure 4:
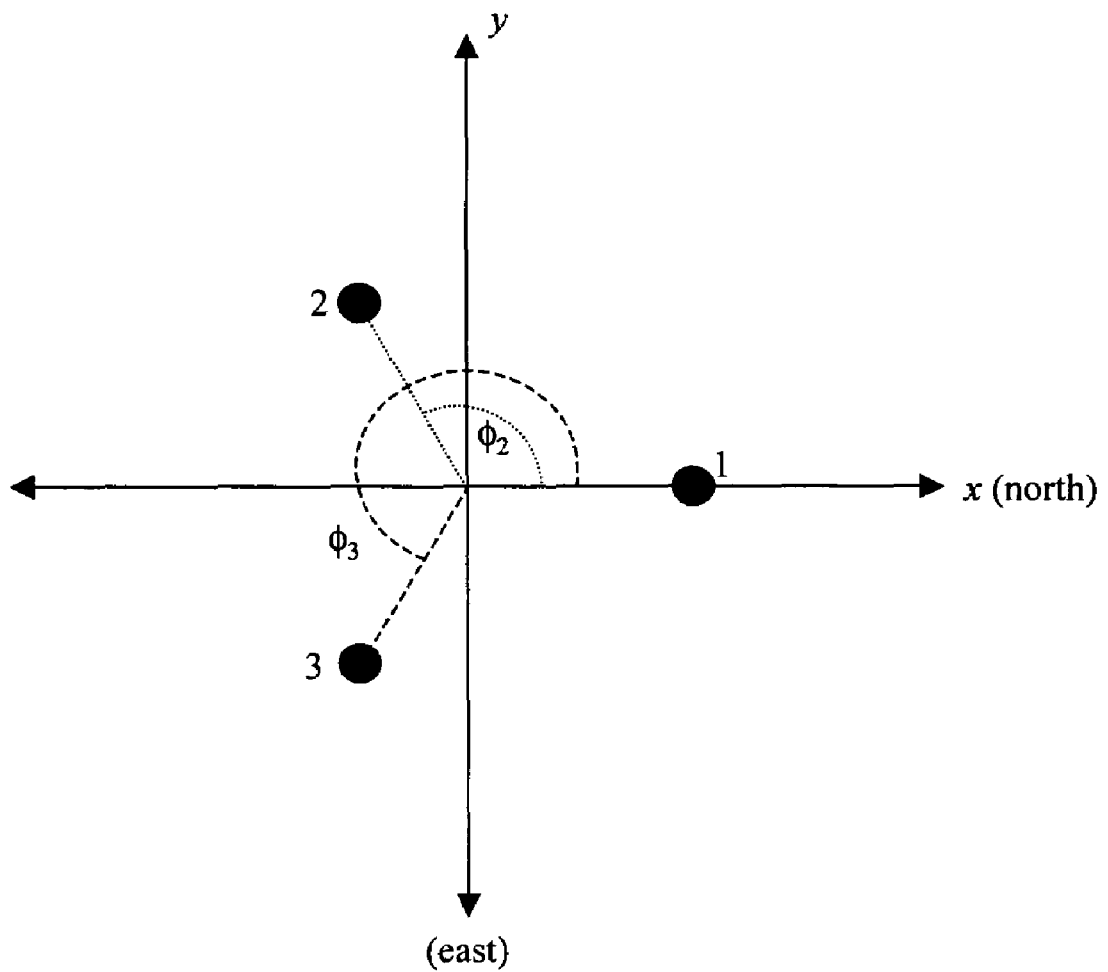
FIG. 4 is a graphical representation of the coordinate system used for the coordinate transformation. The perspective is looking down on the AWAC from the z-direction.

The beam velocities are transformed to U and V estimates. The AWAC 100 has three symmetrically positioned beams 200 along beam unit vectors $b_i = (\cos \phi_i \cos \alpha, \sin \phi_i \cos \alpha, \sin \alpha)$, where $$\phi_1 = 0, \phi_2 = \frac{2}{3}\pi, \phi_3 = \frac{4}{3}\pi,$$ (FIG 4.)

and the vertical angle from the horizontal plane is $\alpha = 65°$. A simplified case of the conversion would be an AWAC 100 with no tilt and pointing north. The transformation would use a constant transformation matrix, M. The transformation from Cartesian to beam and the inverse transformation are given as $$M\vec{U} = \vec{V}_{beam}, \text{ where } M = \begin{bmatrix} \cos\alpha & 0 & \sin\alpha \\ -\frac{1}{2}\cos\alpha & \frac{\sqrt{3}}{2}\cos\alpha & \sin\alpha \\ -\frac{1}{2}\cos\alpha & -\frac{\sqrt{3}}{2}\cos\alpha & \sin\alpha \end{bmatrix}, \text{ and}$$

$$\vec{U} = M^{-1}\vec{V}_{beam}, \text{ where } M^{-1} = \frac{1}{3}\begin{bmatrix} \frac{2}{\cos\alpha} & \frac{1}{\cos\alpha} & -\frac{1}{\cos\alpha} \\ 0 & \frac{\sqrt{3}}{\cos\alpha} & -\frac{\sqrt{3}}{\cos\alpha} \\ \frac{1}{\sin\alpha} & \frac{1}{\sin\alpha} & \frac{1}{\sin\alpha} \end{bmatrix}$$

$$U = \frac{1}{3\cos\alpha}(2v_{b1} - v_{b2} - v_{b3}), V = \frac{\sqrt{3}}{3\cos\alpha}(v_{b3} - v_{b2}),$$

Figure 5:
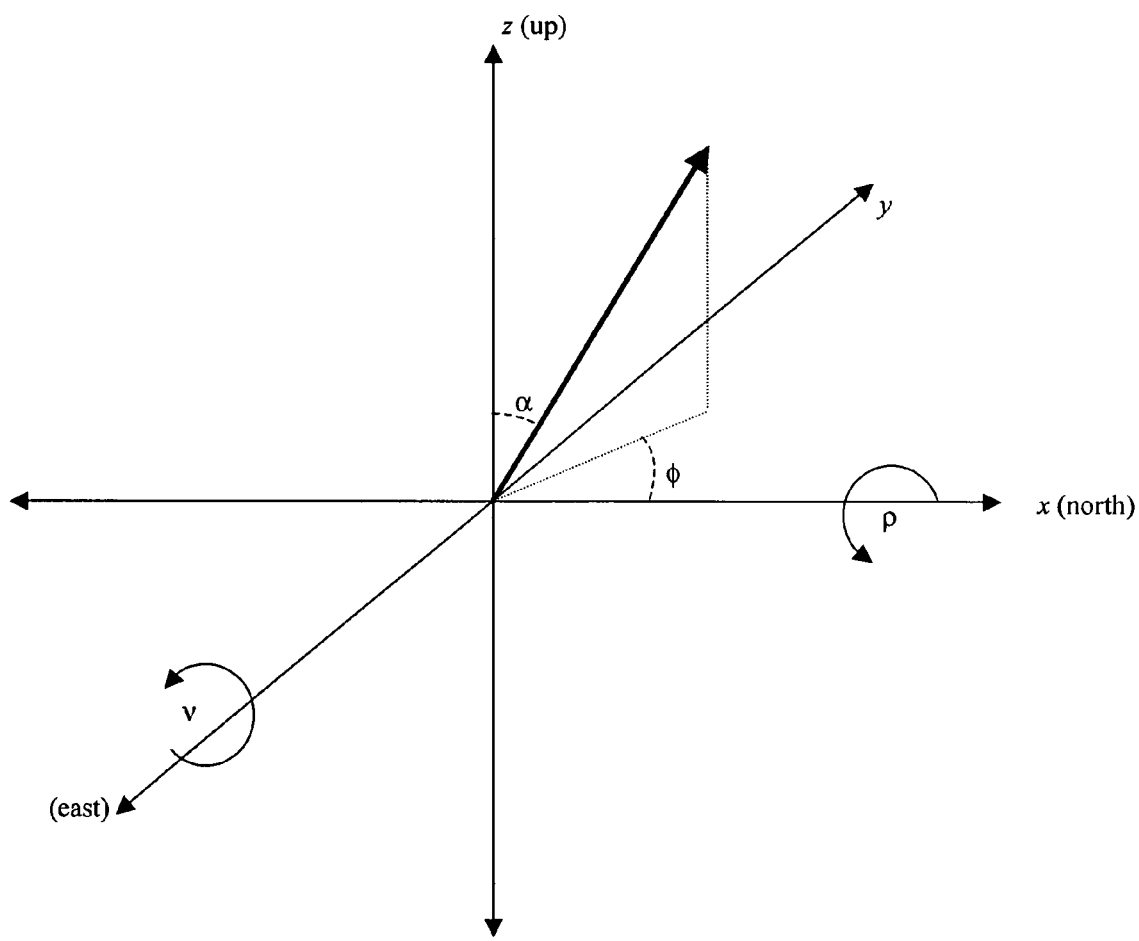
FIG. 5 is a three dimensional graphical representation of the coordinate system used for the coordinate transformation.

When the AWAC platform is in motion, terms describing attitude such as heading and tilt along two axis (roll and pitch) must also be included (FIG. 5). The conversion matrix, M is modified as $M_{full}$=HRM $$H = \begin{bmatrix} \cos\psi & \sin\psi & 0 \\ -\sin\psi & \cos\psi & 0 \\ 0 & 0 & 1 \end{bmatrix}, \text{ and } R = \begin{bmatrix} \cos\upsilon & -\sin\upsilon\sin\rho & -\cos\rho\sin\upsilon \\ 0 & \cos\rho & -\sin\rho \\ \sin\upsilon & \sin\rho\cos\upsilon & \cos\rho\cos\upsilon \end{bmatrix},$$

where $\psi$=heading, $\upsilon$=pitch, and $\rho$=roll

The transformation is not ideal since the orbital velocities along each of the beams 190 is measured at different parts of the wave cycle. We know from linear wave theory that the local velocities are dramatically different under different parts of a wave. Under the crest, local wave velocities move forward with the wave direction, whereas under the trough, local velocities are in the reverse direction. This complicates the transformation since one of the basic assumptions is that the wave velocity is uniform within the boundaries created by the beams. It is clear that the measurement locations for the beams under a wave form will experience different local velocities since they are under different parts of the wave. The transformation from beam to Cartesian coordinates will have an expected error. The end result is an interpolated estimate of U and V at the center of array with an expected error term. The U and V estimates are graphically shown in FIGS. 2 and 3.

The deviations of the U and V estimates from the ideal values have no real consequences for the SUV solution because the non-directional wave estimates and spectra are based on the AST energy distribution. The directional wave parameters and spectra can still use the representative U and V estimates since the error terms cancel out during the directional wave processing procedure.

The U and V estimates are used solely for interpreting the wave directional distribution. The directional distribution and directional wave parameters are dependent upon just the relative amplitudes of the U and V measurements and their phase relative to the AST measurement. The fact that both the phase and relative amplitude information for U and V is retained after converting to Cartesian coordinates allows the SUV to be used to estimate directional quantities.

The SUV solution may be decomposed into two steps or methods. The first step or method is the measurement method 300, which provides necessary measurements of AST, U, and V for the subsequent method 400 of SUV processing to standard wave estimates.

Figure 6:
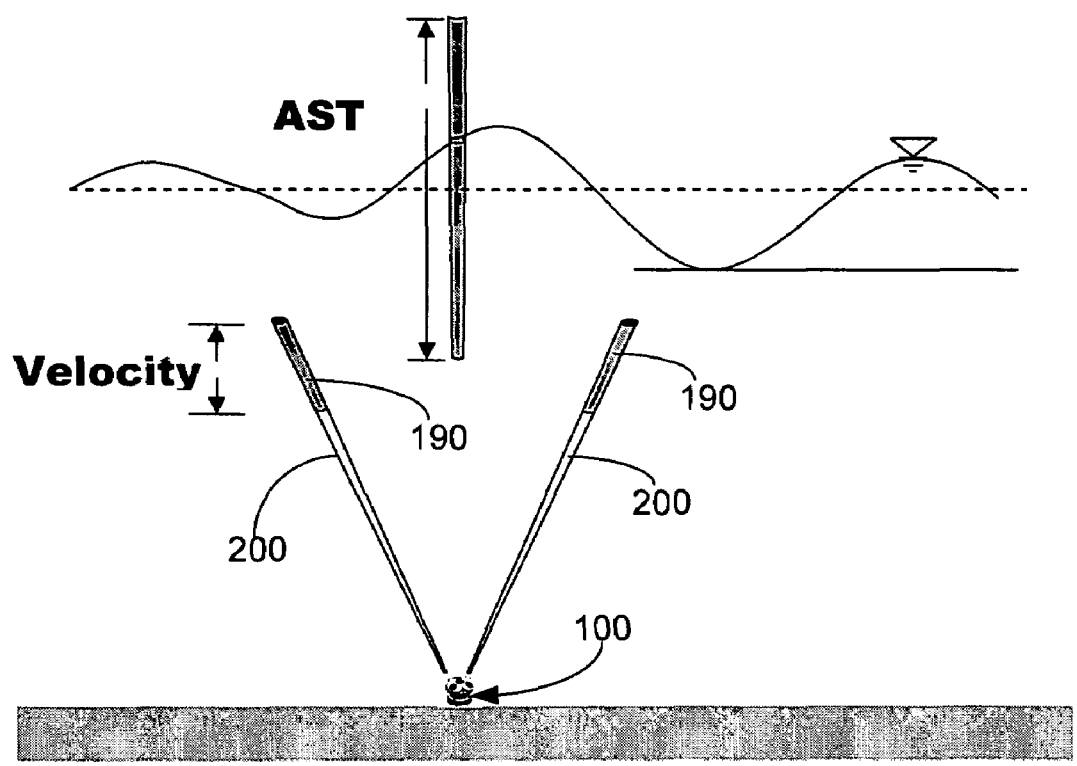
FIG. 6 is a side view of measurement volumes taken during wave burst measurement using the system in FIG. 2.
Figure 7:
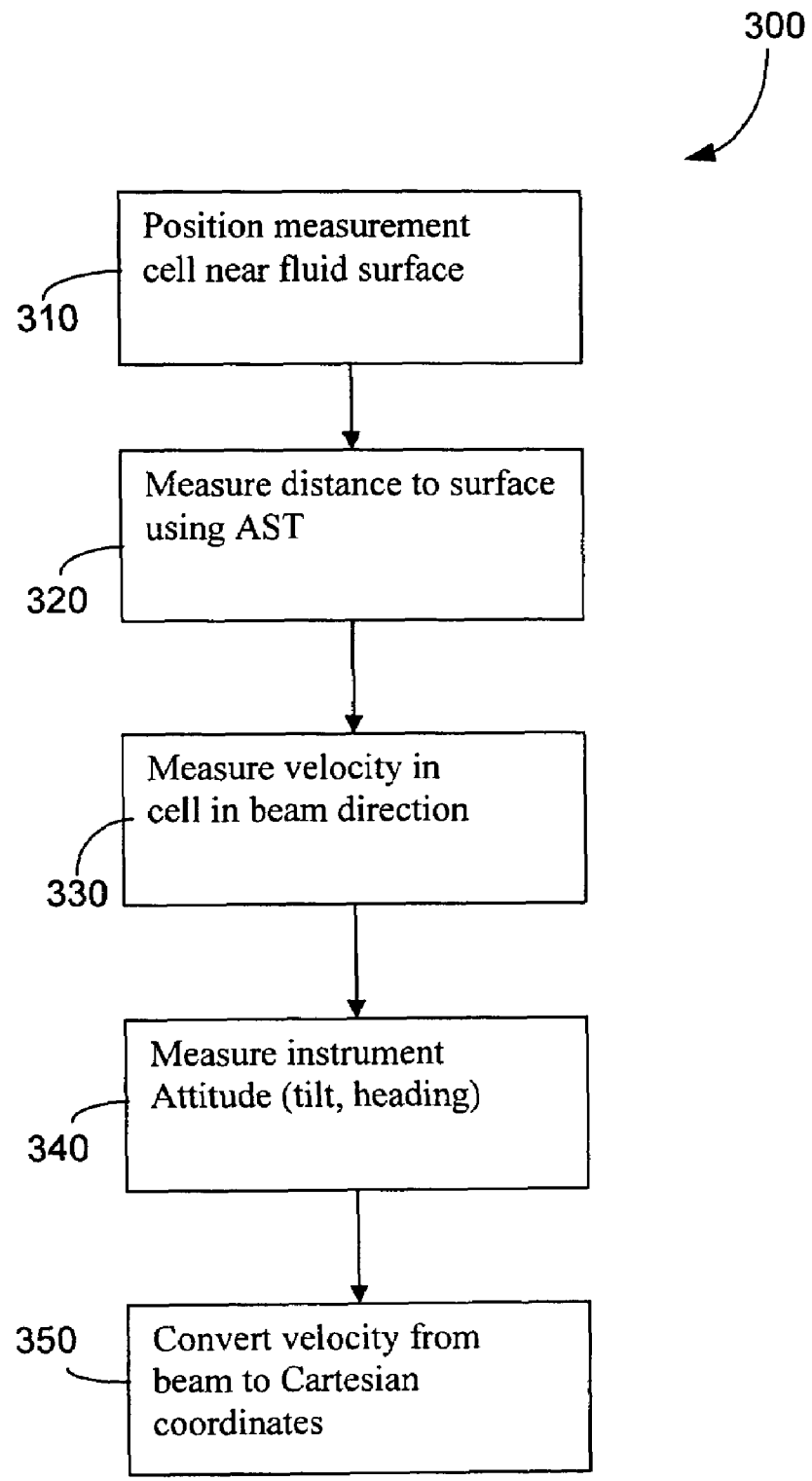
FIG. 7 is a flow chart of an exemplary SUV wave measurement method.

With reference to FIG. 7, the measurement method 300 for obtaining measurements of AST, U, and V will be described. First, a measurement volume and position is defined. This may be done during, but not limited to, a current profile prior to the wave measurements. FIG. 6 is a side view of measurement volumes (shown in shaded gray) taken during wave burst measurement. Measurements may occur, but not limited to, a defined duration ("burst") at a defined sampling rate. As an example, this duration may be 1024 seconds and sampled at 1 Hz. At step 310, the measurement cells 190 are positioned near the fluid surface, and the AST detection window is positioned such that it contains the fluid's surface or interface. At step 320, the distance to the surface is measured using AST. During the ensemble burst for the AST, the AST is measured at the same or higher sampling rate than for the wave burst measurements for the three slanted beams 200. At step 330, velocity in each cell 190 is measured in the beam direction. Each sample provides an estimate of the local wave induced current projected onto the direction of each of the three slanted beams 200 at a defined distance away from the AWAC 100. During each sample measurement, at step 340, the AWAC's attitude is also measured in terms of heading, roll, and pitch. At step 350, measurements are transformed from along beam measurements to an Earth-referenced Cartesian coordinate system. The resulting estimates are two orthogonal estimates of the horizontal velocity. These are also known as U and V. These are subsequently used in the SUV processing 400.

Figure 8:
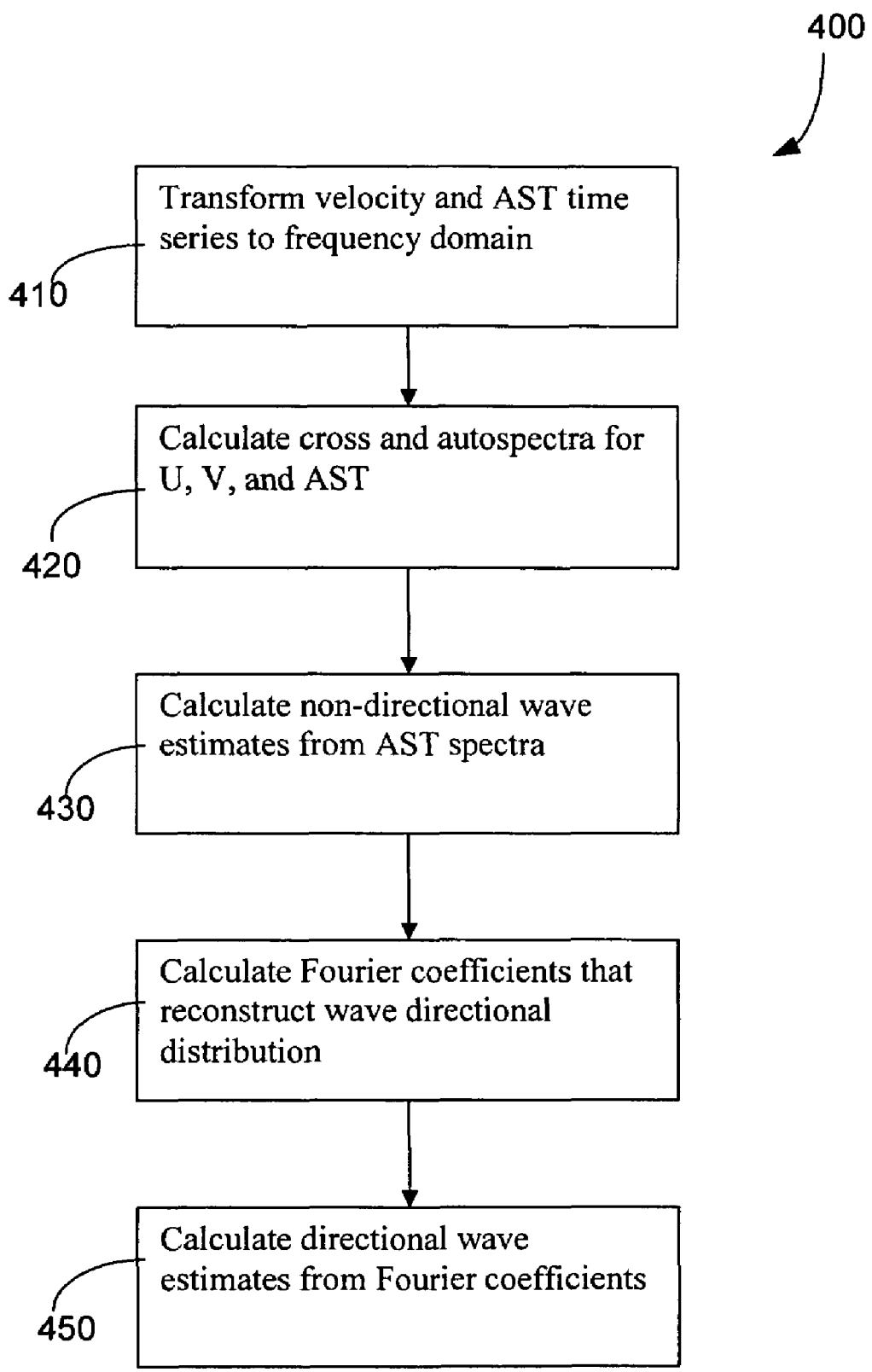
FIG. 8 is a flow chart of an exemplary SUV processing method.

With reference to FIG. 8, the processing method 400 for SUV processing to standard wave estimates will now be described. At step 410, the time series for the AST and U and V velocities are transformed from the time domain to the frequency domain using a standard Fourier transformation (i.e., FFT). At step 420, the Auto and Cross Spectra for the AST, U, and V velocities are calculated. At step 430, the non-directional wave estimates such as wave height and period are calculated using the AST power spectra. At step 440, the Fourier coefficients used to approximate the total directional distribution at each frequency are calculated. At step 450, the directional estimates from the Fourier coefficients are calculated.

Cross Spectra

The full cross spectra is presented as, $C_{xy}=S_x S_y^*$, where S is a spectra of an arbitrary time series and the symbol, * indicates the complex conjugate. The auto and cross spectra are ultimately used for the directional estimates, whereas the auto spectra (or power spectra) is used to estimate wave height and period.

Direction

The total distribution of wave energy, E, over frequency and direction is commonly described with the following relationship; $E(f,\theta)=S(f)D(f,\theta)$. Where S is the energy distribution for the frequency spectrum and D is the normalized directional distribution, such that the following conditions must be met;

$$\int_0^{2\pi} D(f, \theta)d\theta = 1,$$

$$D > 0 \text{ for } [0, 2\pi].$$

The directional distribution, D can be approximated by a Fourier expansion according to, $$D(f, \theta) = \frac{1}{\pi}\left[\frac{1}{2} + \sum_{n=1}^{\infty} \{a_n \cos n\theta + b_n \sin n\theta\}\right] \text{ (Longhuet-Higgens)}$$

The first two pairs of Fourier coefficients provide a truncated version of the full expansion and this has shown to adequately describe the stated directional distribution, D.

$$a_1(f) = \frac{C_{SU}}{\sqrt{C_{SS}(C_{UU} + C_{VV})}}, b_1(f) = \frac{C_{SV}}{\sqrt{C_{SS}(C_{UU} + C_{VV})}},$$

$$a_2(f) = \frac{C_{UU} - C_{VV}}{C_{UU} + C_{VV}}, b_2(f) = \frac{2\text{Re}[C_{UV}]}{C_{UU} + C_{VV}}.$$

The Fourier coefficients may also be used to estimate two classic wave direction parameters, mean direction $\theta_1$ and directional spread $\sigma$ (a measure of circular variance). These two parameters are commonly used to define the directional distribution at discrete frequencies and therefore are presented as a type of spectrum. The mean direction at each frequency is expressed in terms of the first pair of Fourier coefficients: $\theta_1(f)=\arctan(b_1(f)/a_1(f))$. The spreading at each frequency is also expressed in terms of the first pair of Fourier coefficients as $\sigma(f)=[2(1-r_1(f))]^{1/2}$, where $r_1 = \sqrt{a_1^2+b_1^2}$.

The direction at the "peak frequency" is another commonly reported value. This is quite simply an estimate of the mean direction and spread at the frequency where there is the greatest energy in the non-directional spectrum. The peak direction is $\theta_{peak}(f)=\arctan(b_1(f_p)/a_1(f_p))$.

Figure 9:
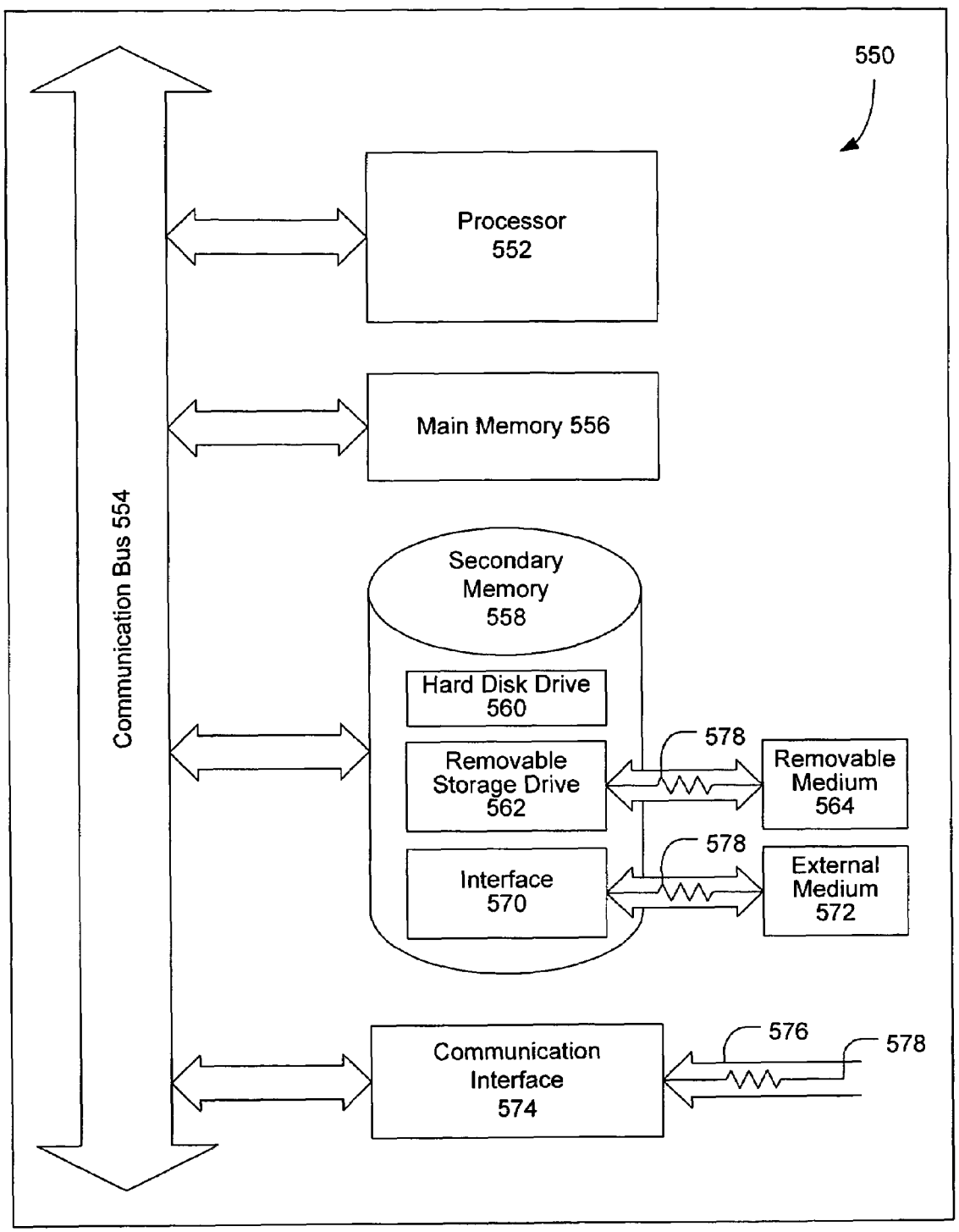
FIG. 9 is a block diagram illustrating an exemplary computer system as may be used in connection with the embodiments of the system and methods described herein.

As indicated above, the AWAC 100 may include an on-board computer system. FIG. 9 is a block diagram illustrating an exemplary computer system 550 that may be used in connection with an on-board computer system or the various other embodiments described herein. However, other computer systems and/or architectures may be used, as will be clear to those skilled in the art having the benefit of this disclosure.

The computer system 550 preferably includes one or more processors, such as processor 552. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 552.

The processor 552 is preferably connected to a communication bus 554. The communication bus 554 may include a data channel for facilitating information transfer between storage and other peripheral components of the computer system 550. The communication bus 554 further may provide a set of signals used for communication with the processor 552, including a data bus, address bus, and control bus (not shown). The communication bus 554 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 550 preferably includes a main memory 556 and may also include a secondary memory 558. The main memory 556 provides storage of instructions and data for programs executing on the processor 552. The main memory 556 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 558 may optionally include a hard disk drive 560 and/or a removable storage drive 562, for example a floppy disk drive, a magnetic tape drive, a compact disc ("CD") drive, a digital versatile disc ("DVD") drive, etc. The removable storage drive 562 reads from and/or writes to a removable storage medium 564. Removable storage medium 564 may be, for example, a floppy disk, magnetic tape, CD, DVD, etc.

The removable storage medium 564 is preferably a computer readable medium having stored thereon computer executable code (i.e., software) and/or data. The computer software or data stored on the removable storage medium 564 is read into the computer system 550 as electrical communication signals 578.

In alternative embodiments, secondary memory 558 may include other similar means for allowing computer programs or other data or instructions to be loaded into the computer system 550. Such means may include, for example, an external storage medium 572 and an interface 570. Examples of external storage medium 572 may include an external hard disk drive or an external optical drive, or and external magneto-optical drive.

Other examples of secondary memory 558 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 572 and interfaces 570, which allow software and data to be transferred from the removable storage unit 572 to the computer system 550.

Computer system 550 may also include a communication interface 574. The communication interface 574 allows software and data to be transferred between computer system 550 and external devices (e.g. printers), networks, or information sources. For example, computer software or executable code may be transferred to computer system 550 from a network server via communication interface 574. Examples of communication interface 574 include a modem, a network interface card ("NIC"), a communications port, a PCMCIA slot and card, an infrared interface, and an IEEE 1394fire-wire, just to name a few.

Communication interface 574 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 574 are generally in the form of electrical communication signals 578. These signals 578 are preferably provided to communication interface 574 via a communication channel 576. Communication channel 576 carries signals 578 and can be implemented using a variety of communication means including wire or cable, fiber optics, conventional phone line, cellular phone link, radio frequency (RF) link, or infrared link, just to name a few.

Computer executable code (i.e., computer programs or software) is stored in the main memory 556 and/or the secondary memory 558. Computer programs can also be received via communication interface 574 and stored in the main memory 556 and/or the secondary memory 558. Such computer programs, when executed, enable the computer system 550 to perform the various functions of the present invention as previously described.

In this description, the term "computer readable medium" is used to refer to any media used to provide computer executable code (e.g., software and computer programs) to the computer system 550. Examples of these media include main memory 556, secondary memory 558 (including hard disk drive 560, removable storage medium 564, and external storage medium 572), and any peripheral device communicatively coupled with communication interface 574 (including a network information server or other network device). These computer readable mediums are means for providing executable code, programming instructions, and software to the computer system 550.

In an embodiment that is implemented using software, the software may be stored on a computer readable medium and loaded into computer system 550 by way of removable storage drive 562, interface 570, or communication interface 574. In such an embodiment, the software is loaded into the computer system 550 in the form of electrical communication signals 578. The software, when executed by the processor 552, preferably causes the processor 552 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Those of skill in the art having the benefit of this disclosure will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A system for determining the directional properties of surface waves or internal waves of a fluid medium, comprising:
   a sonar system having a plurality of transducers for generating respective, separate acoustic beams and receiving echoes from one or more range cells located substantially within the beams, the plurality of transducers including an Acoustic Surface Tracking (AST) transducer for generating acoustic beams and receiving echoes for making AST measurements;
   a computer program executed by a processor for
   a) determining, based on the AST measurements, the distance from the system in the fluid medium to a free surface of the fluid medium and an ideal horizontal plane near the free surface of the fluid medium from which to determine the directional properties of surface waves or internal waves of the fluid medium;
   b) determining the directional properties associated with the surface waves or internal waves from the received echoes;
   c) determining along-beam velocities along the separate acoustic beams; and
   d) combining the along-beam velocities to form an equivalent orbital velocity vector at a central location over the AST transducer in the ideal horizontal plane determined by the AST measurements.

2. The system of claim 1, wherein the computer program measures system attitude and orientation, combines the measured along-beam velocity with system attitude and orientation measurements, and transforms the equivalent orbital velocity vector to a equivalent orbital velocity in a stationary coordinate system.

3. The system of claim 2, wherein the stationary coordinate system is referenced to the geographical or magnetic poles.

4. The system of claim 1, wherein the along-beam velocities are determined close to the surface of the fluid medium.

5. The system of claim 1, wherein the along-beam velocities are determined at any point between the surface of the fluid medium and the system.

6. The system of claim 1, wherein the equivalent orbital velocity vector is combined with acoustic surface tracking (AST) to generate both directional and non-directional wave spectra for the surface waves or internal waves of the fluid medium.

7. The system of claim 6, wherein the directional properties of the surface waves or internal waves of the fluid medium are derived using "wave triplet analyses".

8. The system of claim 1, wherein the transducers are configured so that the respective, separate acoustic beams are non-symmetric and placed at arbitrary angles.

9. The system of claim 1, wherein the transducers are configured so that the respective, separate acoustic beams are slanted relative to a vertical axis.

10. The system of claim 1, wherein the transducers are configured so that the respective, separate acoustic beams are positioned in a horizontal plane.

11. The system of claim 2, wherein the system attitude orientation is measured one time only.

12. The system of claim 2, wherein the system attitude is measured at the same rate as the along-beam velocity measurements.

13. The system of claim 1, wherein the system is mounted on a sub surface buoy that can move or rotate during measurement.

14. The system of claim 1, wherein the system is mounted on a moving underwater vehicle selected from the group consisting of a remote operated vehicle (ROV), an autonomous underwater vehicle (AUV), and a submarine.

15. A method for determining the directional properties of surface waves or internal waves of a fluid medium with a sonar system, comprising:
   determining, based on Acoustic Surface Tracking (AST) measurements performed by an AST transducer of the sonar system, a distance from the sonar system in the fluid medium to a free surface of the fluid medium and an ideal horizontal plane near the free surface of the fluid medium from which to determine the directional properties of surface waves or internal waves of the fluid medium;
   generating respective, separate acoustic beams;
   receiving echoes from one or more range cells located substantially within the beams;

measuring along-beam velocities along the separate acoustic beams;

combining the measured along-beam velocities to form an equivalent orbital velocity vector for the surface waves or internal waves of the fluid medium at a central location over the AST transducer in the ideal horizontal plane determined by the AST measurements.

16. The method of claim 15, further including measuring system attitude and orientation of the sonar system, combining the measured along-beam velocity with system attitude and orientation measurements, and transforming the equivalent orbital velocity vector to a equivalent orbital velocity in a stationary coordinate system.

17. The method of claim 16, wherein the stationary coordinate system is referenced to the geographical or magnetic poles.

18. The method of claim 15, wherein measuring includes measuring the along-beam velocities close to the surface of the fluid medium.

19. The method of claim 15, wherein measuring includes measuring the along-beam velocities at any point between the surface of the fluid medium and the system.

20. The method of claim 15, further including combining the equivalent orbital velocity vector with acoustic surface tracking (AST) to generate both directional and non-directional wave spectra for the surface waves or internal waves of the fluid medium.

21. The method of claim 20, further including deriving the directional properties of the surface waves or internal waves of the fluid medium using "wave triplet analyses".

22. The method of claim 15, wherein generating includes generating the respective, separate acoustic beams so that the respective, separate acoustic beams are non-symmetric and placed at arbitrary angles.

23. The method of claim 15, wherein generating includes generating the respective, separate acoustic beams so that the respective, separate acoustic beams are slanted relative to a vertical axis.

24. The method of claim 15, wherein generating includes generating the respective, separate acoustic beams so that the respective, separate acoustic beams are positioned in a horizontal plane.

25. The method of claim 16, wherein measuring system attitude includes measuring system attitude orientation one time only.

26. The method of claim 16, wherein measuring system attitude includes measuring system attitude orientation at the same rate as the along-beam velocity measurements.

27. The method of claim 15, further including mounting the system on a sub surface buoy that can move or rotate during measurement, and measuring includes measuring along-beam velocities along the separate acoustic beams while the system and sub surface buoy move or rotate.

28. The method of claim 15, further including mounting the system on a moving underwater vehicle selected from the group consisting of a remote operated vehicle (ROV), an autonomous underwater vehicle (AUV), and a submarine, and measuring includes measuring along-beam velocities along the separate acoustic beams with the system mounted to the moving underwater vehicle.

* * * * *